(12) United States Patent
Katsube et al.

(10) Patent No.: US 8,179,660 B2
(45) Date of Patent: May 15, 2012

(54) ELECTRONIC DEVICE AND METHOD FOR MANUFACTURING THE SAME

(75) Inventors: Hiroshi Katsube, Echizen (JP); Jun Nishikawa, Fukui (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 898 days.

(21) Appl. No.: 11/935,854

(22) Filed: Nov. 6, 2007

(65) Prior Publication Data

US 2008/0081200 A1 Apr. 3, 2008

Related U.S. Application Data

(63) Continuation of application No. PCT/JP2006/310389, filed on May 24, 2006.

(30) Foreign Application Priority Data

Mar. 6, 2005 (JP) ................................. 2005-164841

(51) Int. Cl.
*H01G 4/00* (2006.01)

(52) U.S. Cl. ............... 361/306.1; 361/306.3; 361/308.1; 361/309; 361/310

(58) Field of Classification Search ............... 361/306.1, 361/306.3, 308.1, 309, 310
See application file for complete search history.

(56) References Cited

U.S. PATENT DOCUMENTS

| | | | | |
|---|---|---|---|---|
| 3,612,963 A * | 10/1971 | Piper et al. | ................. | 361/321.3 |
| 5,561,587 A * | 10/1996 | Sanada | ...................... | 361/306.1 |
| 5,712,758 A * | 1/1998 | Amano et al. | ............. | 361/321.2 |
| 5,835,339 A * | 11/1998 | Sakamoto et al. | ......... | 361/321.2 |
| 6,295,196 B1 * | 9/2001 | Hamaji et al. | ............. | 361/321.2 |
| 6,346,497 B1 * | 2/2002 | Nakamura et al. | ............ | 501/138 |
| 6,606,238 B1 * | 8/2003 | Nakamura et al. | ......... | 361/321.2 |
| 6,627,120 B2 * | 9/2003 | Shimizu | ..................... | 252/521.2 |

FOREIGN PATENT DOCUMENTS

| | | |
|---|---|---|
| EP | 1 178 024 | 2/2002 |
| JP | 57-93517 | 6/1982 |
| JP | 03-077306 | 4/1991 |
| JP | 04-171912 | 6/1992 |
| JP | 07-057959 | 3/1995 |

(Continued)

OTHER PUBLICATIONS

International Search Report PCT/JP2006/310389 dated Jun. 20, 2006.

(Continued)

*Primary Examiner* — Cathy Lam
(74) *Attorney, Agent, or Firm* — Dickstein Shapiro LLP (57) ABSTRACT

A highly reliable electronic device that prevents entry of a plating solution via an external electrode and entry of moisture of external environment inside thereof, and generates no soldering defects or solder popping defects which are caused by precipitation of a glass component on a surface of the external electrode. The electrode structure of the electronic device is formed of Cu-baked electrode layers primarily composed of Cu, Cu plating layers formed on the Cu-baked electrode layers and which are processed by a recrystallization treatment, and upper-side plating layers formed on the Cu plating layers. After the Cu plating layers are formed, a heat treatment is performed at a temperature in the range of a temperature at which the Cu plating layers are recrystallized to a temperature at which glass contained in a conductive paste is not softened, so that the Cu plating layers are recrystallized.

6 Claims, 3 Drawing Sheets

FOREIGN PATENT DOCUMENTS

| | | |
|---|---|---|
| JP | 7-335486 | 12/1995 |
| JP | 8-264371 | 10/1996 |
| JP | 10-92602 | 4/1998 |
| JP | 2000-100647 | 4/2000 |
| JP | 2001-230151 | 8/2001 |
| JP | 2004-55679 | 2/2004 |
| JP | 2004-172383 | 6/2004 |
| JP | 2005-64494 | 3/2005 |
| JP | 2005-164841 | 6/2005 |

OTHER PUBLICATIONS

Written Opinion PCT/JP2006/310389 dated Jun. 20, 2006.

* cited by examiner

ELECTRONIC DEVICE AND METHOD FOR MANUFACTURING THE SAME

CROSS REFERENCE TO RELATED APPLICATIONS

The present application is a continuation of International Application No. PCT/JP2006/310389, filed May 24, 2006, which claims priority to Japanese Patent Application No. JP2005-164841, filed Jun. 3, 2005, the entire contents of each of these applications being incorporated herein by reference in their entirety.

FIELD OF THE INVENTION

The present invention relates to an electronic device and a method for manufacturing the same, and more particularly, relates to an electronic device having the structure in which an external electrode is formed on a surface of an electronic device main body and to a method for manufacturing the electronic device.

BACKGROUND OF THE INVENTION

Figure 2:
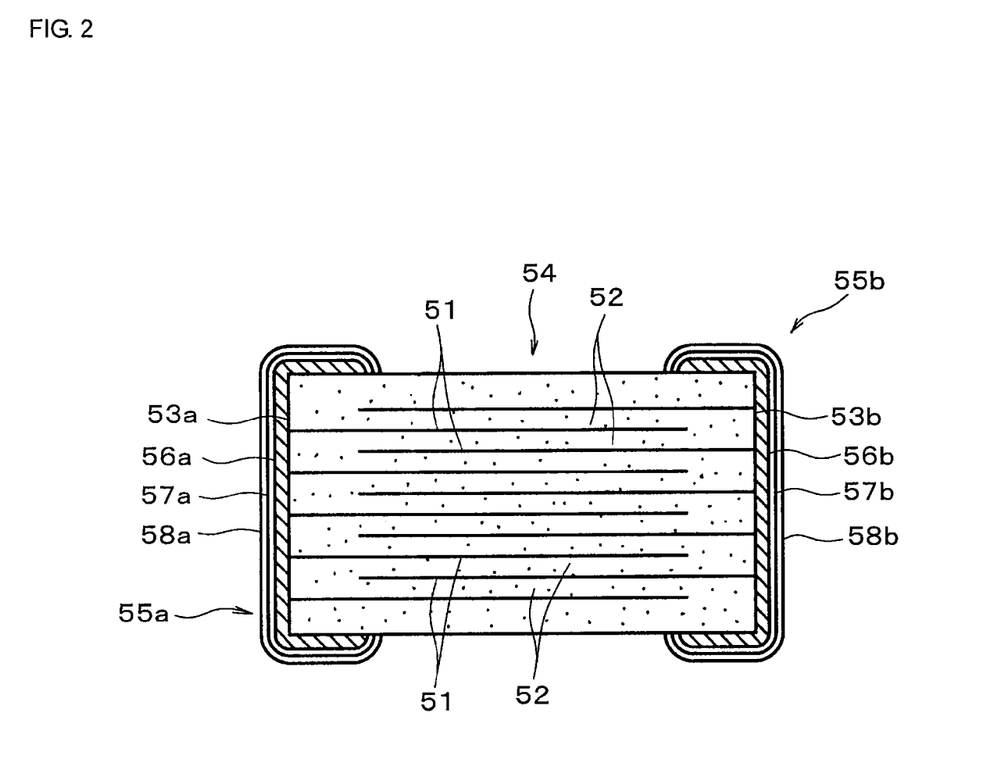
FIG. 2 is a cross-sectional view showing the structure of a conventional electronic device (multilayer ceramic capacitor).

For example, as shown in FIG. 2, a multilayer ceramic capacitor, one of representative ceramic electronic devices, has a ceramic element 54 and two external electrodes 55a and 55b provided on two end portions thereof. The ceramic element 54 has internal electrodes (such as Ni electrodes) 51 which are disposed to face each other with ceramic layers 52 interposed therebetween and which are alternately extended to two end surfaces 53a and 53b located in opposite directions, so that the two external electrodes 55a and 55b are electrically connected to the internal electrodes 51.

In addition, the external electrodes 55a and 55b are formed, for example, by the steps of applying a conductive paste (Cu paste in this case) to the ceramic element 54, then baking the conductive paste to form Cu-baked electrode layers 56a and 56b, forming Ni plating layers 57a and 57b on the Cu-baked electrode layers 56a and 56b to prevent dissolution by solder, and further forming Sn plating layers 58a and 58b on the Ni plating layers 57a and 57b in order to improve solder wettability, and hence the external electrodes 55a and 55b have a three-layered structure composed of the Cu-baked electrode layers 56a and 56b used as an underlayer, the Ni plating layers 57a and 57b used as an interlayer, and the Sn plating layers 58a and 58b used as an upper layer (surface layer), respectively.

Although the Ni plating layers 57a and 57b are to be used as an interlayer function to prevent entry of a Sn plating solution and moisture of external environment, since minute voids are inherently present in the Ni plating layers 57a and 57b, the function of preventing the entry of a plating solution and moisture is not satisfactory.

Accordingly, in order to prevent the entry of a plating solution and moisture, the Cu-baked electrode layer must be formed in a dense state by baking. However, in a baking step in which the Cu-baked electrode layer is densified by baking, glass moves up to the surface of the Cu-baked electrode layer and precipitates thereon, thereby, for example, causing a plating defect in a subsequent step of forming the Ni plating layers 57a and 57b and/or causing solder popping in a mounting step (soldering step) due to degradation in denseness of the Ni plating layer. As described above, the defects caused by so called "glass scum" disadvantageously occur.

Accordingly, in order to solve the above problems, a method has been proposed (for example, in Patent Document 1) to obtain a baked electrode which can be densified and which has good plating properties by optimizing an electrode material.

In this method, a conductive paste is used which contains a powdered metal primarily composed of a powdered Cu including a flake-shaped Cu powder having a specific surface area, a long diameter, and a thickness, which meet respective specifications, and a spherical-shaped Cu powder at a predetermined ratio; a glass powder; a binder; and an organic solvent, and external electrodes are formed by applying this conductive paste on predetermined regions of a ceramic element, followed by baking.

In addition, according to this method, it is described that external electrodes can be formed which have an appropriate denseness and which are able to prevent precipitation of a glass component (binding agent) on the surface and the entry of a plating solution inside the ceramic element.

However, since this method is liable to be influenced by the changes in electrode material and process, it is not easy to ensure sufficient reliability, and in addition to that, there has been a problem in that higher-level requirements in the future cannot be easily satisfied.

Figure 3:
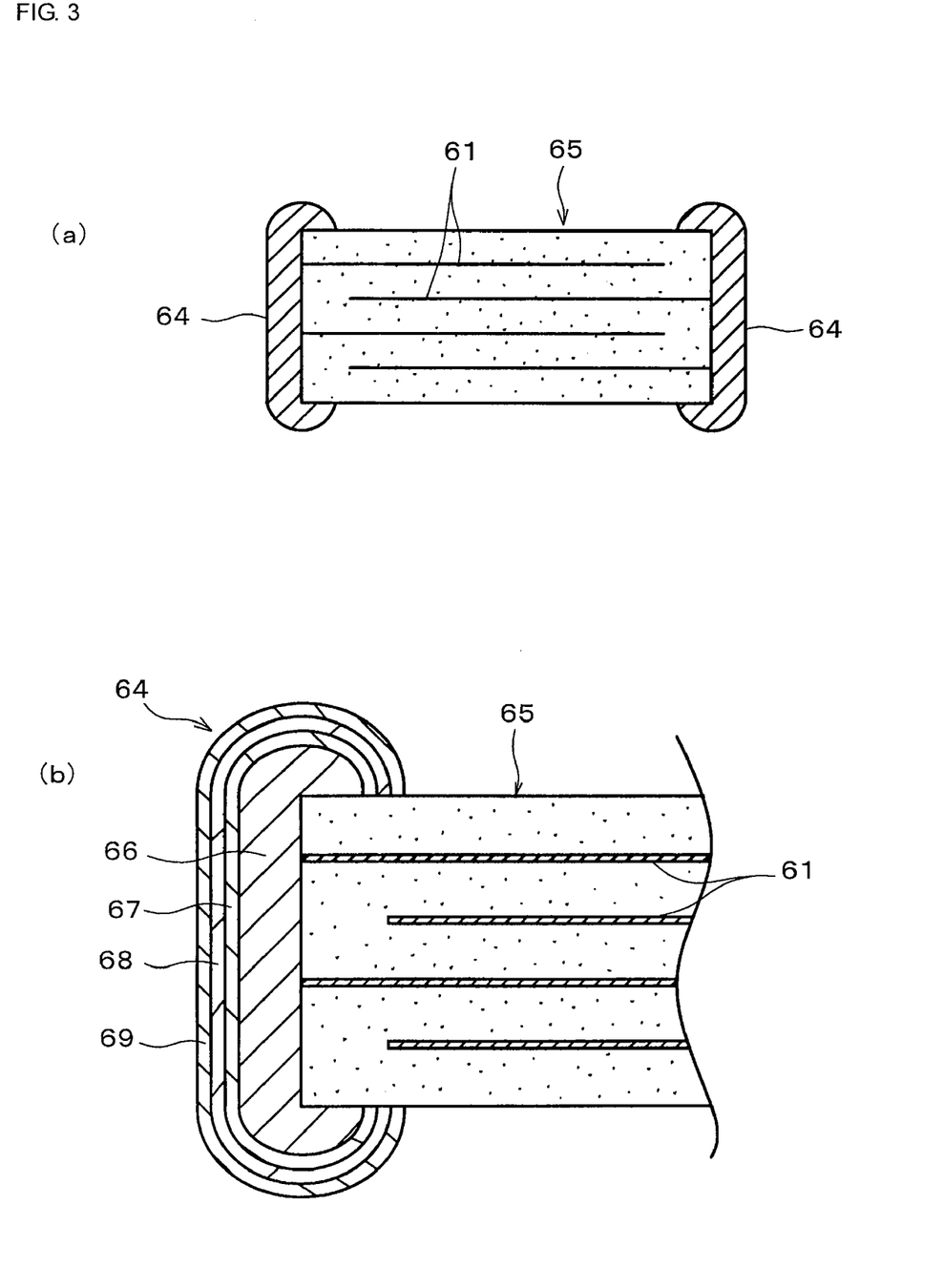
FIG. 3(a) is a cross-sectional view showing the structure of another conventional electronic device (multilayer ceramic capacitor)
FIG. 3(b) is an enlarged cross-sectional view of an important portion.

In addition, as another conventional technique, an electronic device has been proposed (for example, in Patent Document 2) in which as shown in FIGS. 3(a) and (b), as external electrodes 64 provided for an electronic device main body 65 having internal electrodes 61 disposed therein, external electrodes are formed each having a four-layered structure composed of a Cu-baked electrode layer 66, a Cu plating layer 67, a Ni plating layer 68, and a noble-metal plating layer 69.

That is, in this electronic device, the external electrodes 64 each have a four-layered structure composed of a first external electrode layer (Cu-baked electrode layer 66) formed by baking a past containing powdered Cu or a powdered Cu alloy, a second external electrode layer (Cu plating layer 67) of a Cu plating film formed on the first external electrode layer, a third external electrode layer (Ni plating layer 68) of a Ni plating film formed on the second external electrode layer, and a fourth external electrode layer (noble-metal plating layer 69) of a noble-metal plating film formed on the third external electrode layer.

However, in the case of this Patent Document 2, since minute voids are generally present in the Cu plating layer 67, the entry of a plating solution and moisture of external environment cannot be always sufficiently prevented, and as a result, there has been a problem of inferior reliability.

Patent Document 1: Japanese Unexamined Patent Application Publication No. 2004-172383
Patent Document 2: Japanese Unexamined Patent Application Publication No. 2004-55679

SUMMARY OF THE INVENTION

The present invention is conceived to solve the above problems, and an object of the present invention is to provide a highly reliable electronic device and a method for manufacturing the same, the electronic device preventing entry of a plating solution via an external electrode and entry of moisture of external environment inside thereof, and generating no soldering defects nor solder popping defects which are caused by precipitation of a glass component on a surface of the external electrode.

To this end, an electronic device according to the present invention comprises: an electronic device main body; and an external electrode formed on a surface of the electronic device main body, and in this electronic device, the external electrode includes: a Cu-baked electrode layer primarily composed of Cu; a Cu plating layer which is formed on the Cu-baked electrode layer and which is processed by a recrystallization treatment; and at least one upper-side plating layer formed on the Cu plating layer which is processed by the recrystallization treatment.

In addition, the electronic device main body includes a ceramic sintered body and an internal electrode disposed therein, and the external electrode is electrically connected to the internal electrode.

In addition, there is provided a method for manufacturing an electronic device which includes: an electronic device main body; and an external electrode formed on a surface of the electronic device main body, the external electrode having a Cu-baked electrode layer primarily composed of Cu; a Cu plating layer which is formed on the Cu-baked electrode layer; and at least one upper-side plating layer formed on the Cu plating layer. The method for manufacturing an electronic device, described above, comprises:

a step of applying a conductive paste containing glass and a Cu powder as a primary component to the electronic device main body, followed by baking at a predetermined baking temperature, to form the Cu-baked electrode layer;

a step of precipitating Cu on the Cu-baked electrode layer to form the Cu plating layer;

a step of performing a heat treatment at a temperature in the range of a temperature at which the Cu plating layer is recrystallized to a temperature at which the glass contained in the conductive paste is not softened (both inclusive) so as to recrystallize the Cu plating layer; and a step of further precipitating a metal on the Cu plating layer to form the upper-side plating layer.

The electronic device of the present invention is an electronic device having an electronic device main body and an external electrode provided on a surface of the electronic device main body, and the external electrode includes: a Cu-baked electrode layer primarily composed of Cu; a Cu plating layer which is formed on the Cu-baked electrode layer and which is processed by a recrystallization treatment; and at least one upper-side plating layer formed on the Cu plating layer which is processed by the recrystallization treatment. Since the texture of the Cu plating layer processed by the recrystallization treatment is dense, a highly reliable electronic device can be obtained that is able to prevent the entry of a plating solution inside a ceramic element via the external electrode and entry of moisture of external environment inside thereof.

In addition, instead of preventing the entry of a plating solution and moisture of external environment by a dense Cu-baked electrode layer obtained by baking, since the Cu plating layer processed by the recrystallization treatment is provided, the entry of a plating solution and moisture in external environment is prevented by the dense Cu plating layer obtained by the recrystallization. Accordingly, the generation of so-called "glass scum" can be suppressed in which a glass component moves to and precipitates on the surface of the Cu-baked electrode layer when baking is excessively carried out to obtain a dense Cu-baked electrode layer. Hence, as a result, the generation of defects, such as plating defects in a subsequent plating step (such as a Ni plating step or a solder plating step) for forming the upper-side plating layer and/or solder popping defects caused by degradation in denseness of a plating layer to be formed, can be suppressed or prevented.

In addition, when the electronic device main body has a ceramic sintered body and an internal electrode provided therein, and when the external electrode is electrically connected to the internal electrode, the internal electrodes are prevented from being damaged by the entry of a plating solution inside the electronic device main body, and properties are prevented from being degraded by the entry of moisture of external environment inside the electronic device main body; hence, a highly reliable electronic device (such as a multilayer ceramic capacitor) can be provided.

In addition, the method for manufacturing an electronic device according to the present invention comprises a step of applying a conductive paste containing glass and a Cu powder as a primary component to the electronic device main body, followed by baking at a predetermined baking temperature, to form the Cu-baked electrode layer; a step of precipitating Cu on the Cu-baked electrode layer to form the Cu plating layer; a step of performing a heat treatment at a temperature in the range of a temperature at which the Cu plating layer is recrystallized to a temperature at which the glass contained in the conductive paste is not softened (both inclusive) so as to recrystallize the Cu plating layer; and a step of further precipitating a metal on the Cu plating layer to form the upper-side plating layer. Hence, an electronic device having an external electrode disposed on a surface of the electronic device main body can be efficiently manufactured, the external electrode including the Cu-baked electrode layer primarily composed of Cu; the Cu plating layer formed on the Cu-baked electrode layer; and at least one upper-side plating layer formed on the Cu plating layer.

That is, according to the method for manufacturing an electronic device of the present invention, a highly reliable electronic device can be efficiently manufactured which has an external electrode capable of preventing the entry of a plating solution and moisture of external environment inside thereof.

REFERENCE NUMERALS 1 internal electrode
2 ceramic layer
3a, 3b end surface
4 ceramic element (electronic device main body)
5a, 5b external electrode
6a, 6b Cu-baked electrode layer
7a, 7b Cu plating layer
8a, 8b Ni Plating layer
9a, 9b Sn plating layer

DETAILED DESCRIPTION OF THE INVENTION

Hereinafter, with reference to examples of the present invention, features of the present invention will be described in more detail.

EXAMPLE 1

Figure 1:
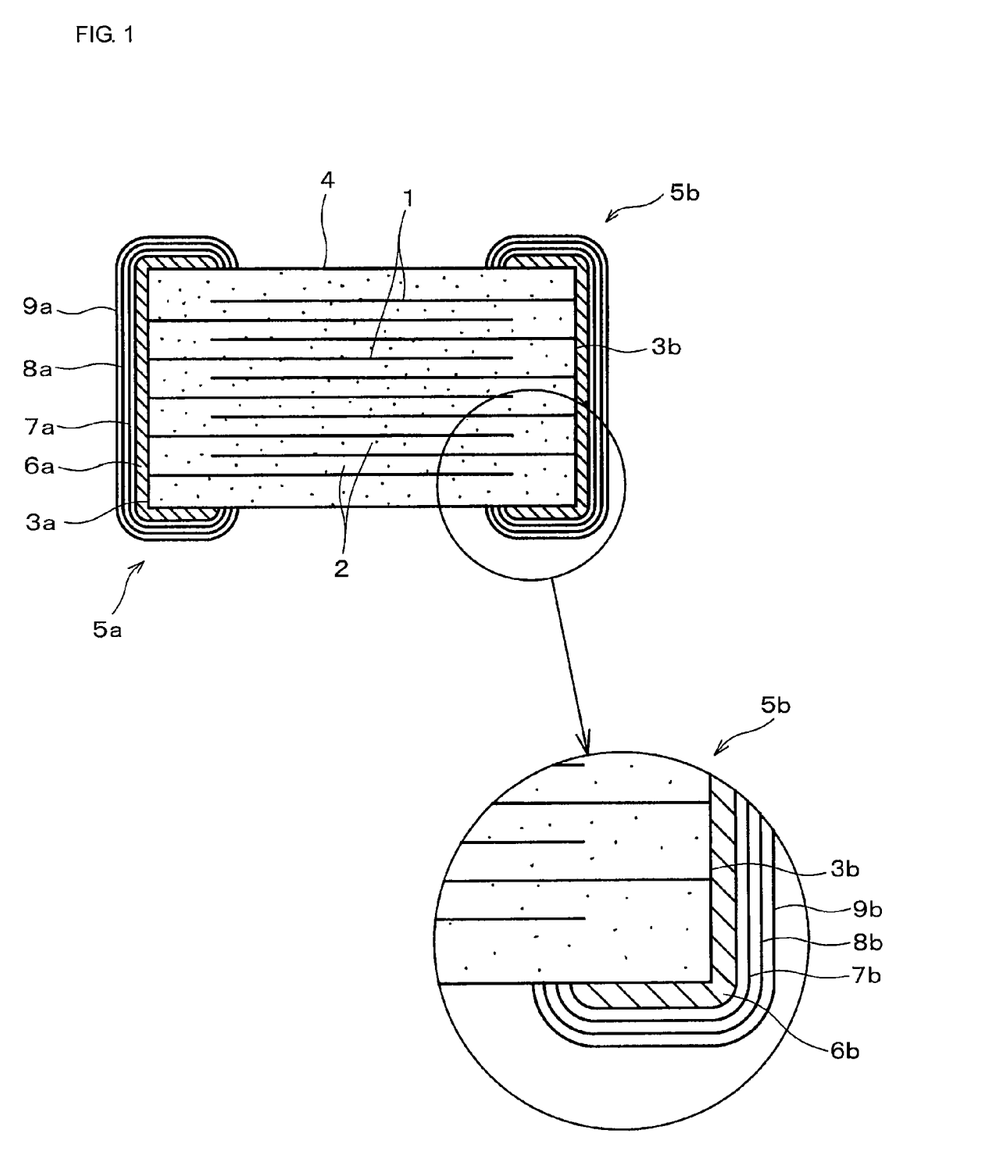
FIG. 1 is a cross-sectional view showing the structure of an electronic device (multilayer ceramic capacitor) of one embodiment according to the present invention.

FIG. 1 is a cross-sectional view showing the structure of an electronic device (multilayer ceramic capacitor in this example) manufactured by a method for manufacturing an electronic device according to an example (example 1) of the present invention.

This multilayer ceramic capacitor is composed of two external electrodes 5a and 5b and a ceramic element (electronic device main body) 4 having internal electrodes (such as Ni electrodes) 1 which are disposed to face each other with ceramic layers 2 interposed therebetween and which are alternately extended to opposite end surfaces 3a and 3b, and the two external electrodes 5a and 5b are provided for the ceramic element 4 so as to be electrically connected to the internal electrodes 1.

In addition, in the multilayer ceramic capacitor of this example, the external electrodes 5a and 5b have a four-layered structure including Cu-baked electrode layers 6a and 6b, Cu plating layers 7a and 7b formed thereon, Ni plating layers 8a and 8b for preventing dissolution by solder, and Sn plating layers 9a and 9b formed thereon for improving solder wettability, respectively.

Hereinafter, a method for manufacturing this multilayer ceramic capacitor will be described.

(1) First, after powdered Cu and a glass frit primarily composed of a ZnO—B$_2$O$_3$—SiO$_2$-based glass were mixed together, an appropriate amount of an organic vehicle was added thereto, and a mixture thus obtained was mixed and dispersed using a three-roll mixer to form a conductive paste. The glass used in this example was a glass having a softening point slightly higher than 600° C.

(2) Next, two end surface sides of the fired ceramic element (electronic device main body) 4 were immersed in the conductive paste so as to be coated therewith, and drying was then performed.

(3) Subsequently, by baking the conductive paste at 800° C. for 5 minutes in a nitrogen atmosphere, the Cu-baked electrode layers 6a and 6b were formed.

(4) Next, Cu electroplating was performed, so that the Cu plating layers 7a and 7b were formed on the Cu-baked electrode layers 6a and 6b, respectively.

(5) Subsequently, a heat treatment was performed under predetermined conditions in a nitrogen atmosphere, so that a recrystallization treatment was performed for the Cu plating layers 7a and 7b.

(6) Next, Ni electroplating was performed, so that the Ni plating layers 8a and 8b were formed on the Cu plating layers 7a and 7b, respectively, in order to prevent dissolution by solder.

(7) Furthermore, Sn plating layer 9a and 9b were formed on the above Ni plating layers 8a and 8b, respectively, so as to improve solder wettability.

Accordingly, multilayer ceramic capacitors (samples) each having the external electrodes 5a and 5b of a four-layered structure as shown in FIG. 1 were obtained.

In addition, for comparison purpose, multilayer ceramic capacitors (samples of comparative examples) were formed without a heat treatment (recrystallization treatment) or with a heat treatment (recrystallization treatment) which did not satisfy the conditions of the present invention.

The structures of the samples of the examples and the comparative examples were as follows.

| | |
|---|---|
| Dimensions: | length: 2.0 mm, width: 1.25 mm, height: 1.25 mm |
| Dielectric ceramic: | BiTiO$_3$-based dielectric ceramic |
| Number of laminated internal electrodes: | 400 |
| Material for internal electrode: | Ni |
| Structure of external electrode: | Cu-baked electrode layer (underlayer electrode)/Cu plating layer/Ni plating layer/Sn plating layer |
| Atmosphere for heat treatment (recrystallization treatment) of Cu plating layer: | nitrogen atmosphere |

Subsequently, a plating test, a reliability test (PCBT test), and a solder popping test were performed in accordance with the following methods for the multilayer ceramic capacitors thus prepared.

[Plating Test]

For 100 samples (multilayer ceramic capacitors) of each example, the plating test was performed in which after the Sn plating layer was peeled away from the electrode using a stripping agent, the surface thereof was observed by a stereo microscope (magnification: 50 times). In addition, after the Sn plating layer was peeled away, a sample having a spot on the electrode surface at which the Ni plating layer was not formed was counted as a defective.

[Reliability Test (PCBT Test)]

As for the reliability test (PCBT test), after 72 samples (multilayer ceramic capacitors) of each example were mounted on a substrate using a SnZnBi solder, the solder was remelted so that the multilayer ceramic capacitors were removed from the substrate, followed by a PCBT test performed at 125° C., 95% Rh, and a rated voltage for 72 hours. Subsequently, a sample having an insulating resistance lower than its initial value was counted as a defective.

[Solder Popping Test]

The solder popping test was performed such that after 500 samples (multilayer ceramic capacitors) of each example were mounted on a substrate on which SnPb eutectic solder was printed, reflow mounting was performed, and the substrate was then observed by a stereo microscope (magnification: 50 times). A sample in which a solder ball was popped away was counted as a defective.

The results are shown in Table 1.

TABLE 1

| | Heat Treatment (Recrystallization Treatment) Conditions (° C./min) | Average Particle Diameter of Particles of Cu Plating Layer (μm) | Generation of Defects in Plating Test (# of defectives/total #) | Generation of Defects in Reliability Test (# of defectives/total #) | Generation of Defects in Solder Popping Test (# of defectives/total #) |
|---|---|---|---|---|---|
| Example 1 | 400/20 | 3.0 | 0/100 | 22/72 | 0/500 |
| Example 2 | 500/20 | 4.0 | 0/100 | 7/72 | 0/500 |
| Example 3 | 600/20 | 5.0 | 0/100 | 0/72 | 0/500 |
| Comparative Example 1 | No heat treatment | 0.5 | 0/100 | 72/72 | 0/500 |
| Comparative | 200/20 | 1.0 | 0/100 | 72/72 | 0/500 |

TABLE 1-continued

| | Heat Treatment (Recrystallization Treatment) Conditions (° C./min) | Average Particle Diameter of Particles of Cu Plating Layer (μm) | Generation of Defects in Plating Test (# of defectives/ total #) | Generation of Defects in Reliability Test (# of defectives/ total #) | Generation of Defects in Solder Popping Test (# of defectives/total #) |
|---|---|---|---|---|---|
| Example 2 Comparative Example 3 | 700/20 | 6.0 | 2/100 | 24/72 | 3/500 |

As shown in Table 1, in the case of the multilayer ceramic capacitors of comparative example 1 which were not processed by the heat treatment (recrystallization treatment), defects were observed in all of 72 samples in the reliability test (PCBT test) The reason for this is believed that the particles of the Cu plating layer were not recrystallized, and hence densification thereof was not advanced.

In addition, as shown in Table 1, also in the case of the multilayer ceramic capacitors of comparative example 2 which were processed by a heat treatment at 200° C., defects were also observed in all of 72 samples in the reliability test (PCBT test) as in the case of comparative example 1 in which the heat treatment (recrystallization treatment) was not performed. The reason for this is believed that since the temperature was low by a heat treatment at 200° C. for 20 minutes, although the average particle diameter of the Cu particles forming the Cu plating layer was increased to a certain extent, it was not grown large as compared to that obtained by recrystallization, and as a result, densification of the Cu plating layer was not advanced.

In addition, as shown in Table 1, in the case of the multilayer ceramic capacitors of comparative example 3 which were processed by a heat treatment (recrystallization treatment) at 700° C., the number of defectives was decreased to 24 out of 72 samples in the reliability test (PCBT test) as compared to that of comparative example 1 in which the heat treatment (recrystallization treatment) was not performed and to that of comparative example 2 in which the heat treatment was performed at 200° C., a temperature lower than the recrystallization temperature, for 20 minutes. However, the number of defectives in the plating test was 2 out of 100 samples, and the number of defectives was 3 out of 500 samples in the solder popping test; hence, preferable results could not be obtained. The reason for this is believed that although the particles of the Cu plating layer could be recrystallized by the heat treatment at 700° C. for 20 minutes, due to softening of glass contained in the Cu-baked electrode layer, the glass flowed out, and as a result, sealing properties were degraded. In addition, it is also believed that as the Cu-baked electrode was being sintered, the glass moved to (or precipitated on) the surface of the Cu plating layer, and hence defects, such as plating defects and solder popping defects, occurred besides degradation in reliability. In addition, under the heat treatment conditions in comparative example 3 at 700° C. for 20 minutes, since the surface of the Cu plating layer was oxidized to a certain extent due to a high temperature, Ni plating properties were degraded, and thereby the denseness of the Ni plating layer was also degraded; hence, it is also believed that this degradation in denseness was also partly responsible for the generation of the solder popping defect.

On the other hand, in the cases of the multilayer ceramic capacitors of examples 1 to 3 in which the heat treatments (recrystallization treatments) were performed at 400° C. for 20 minutes (example 1), at 500° C. for 20 minutes (example 2), and at 600° C. for 20 minutes (example 3), the results of the plating test, the reliability test, and the solder popping test were all superior, and hence it was confirmed that a multilayer ceramic capacitor having desired properties could be obtained.

In particular, in the case of the multilayer ceramic capacitors of example 3 in which the heat treatment (recrystallization treatment) was performed at 600° C. for 20 minutes (example 3), in all of the plating test, the reliability test, and the solder popping test, no defects were observed, and hence the most preferable result was obtained. The reasons for this are believed that in the heat treatment performed at 400° C. (example 1) and at 500° C. (example 2), a Cu plating layer having a dense texture capable of completely preventing the entry of a plating solution and moisture could not be obtained, and that on the other hand, when the heat treatment temperature was increased to 600° C., the recrystallization of the Cu plating layer was further advanced, and the texture thereof was changed to a more dense structure.

In the examples described above, although the multilayer ceramic capacitors are described by way of example, the present invention can be applied to, besides the multilayer ceramic capacitor, various electronic devices each having external electrodes provided on surfaces of a electronic device main body, such as a multilayer varistor, a multilayer LC composite device, and a multilayer circuit substrate. Also in this case, an effect similar to that of the above examples can be obtained.

In addition, in the above examples, although the Ni plating layer and the Sn plating layer are formed on the Cu plating layer processed by a heat treatment (recrystallization treatment), the type and the number of the upper-side plating layers formed on the Cu plating layer processed by a heat treatment (recrystallization treatment) are not particularly limited, and for example, after a Ni plating layer is formed on the Cu plating layer processed by a heat treatment (recrystallization treatment), a Sn—Pb plating layer may be formed on the Ni plating layer instead of the Sn plating layer of the examples.

In addition, the other points of the present invention are not also limited to the above examples, and the types of materials forming an electronic device main body, concrete structures thereof, materials forming internal electrodes, the presence or the absence thereof, and the like may be variously changed and modified without departing from the spirit and the scope of the present invention.

As has thus been described, according to the present invention, since the Cu plating layer formed on the Cu-baked electrode layer is recrystallized by a heat treatment performed at a temperature in the range of a temperature at which the Cu plating layer is recrystallized to a temperature at which the glass contained in the conductive paste is not softened (both inclusive), and the Cu plating layer thus processed by the recrystallization treatment has a dense texture, a highly reliable ceramic electronic device capable of preventing the entry of a plating solution and moisture of external environment inside a ceramic element via external electrodes can be obtained.

In addition, since it is not necessary to form a dense Cu-baked electrode layer by baking, the generation of defects, such as plating defects and solder popping defects caused by degradation in denseness of the plating layer, can be suppressed or prevented.

Accordingly, the present invention can be widely applied to various electronic devices having the structure in which an external electrode is provided on a surface of an electronic device main body and to methods for manufacturing the above electronic devices.

The invention claimed is:

1. An electronic device comprising:
   an electronic device main body; and
   an external electrode formed on a surface of the electronic device main body, wherein the external electrode includes:
   a Cu-baked electrode layer primarily composed of Cu;
   a recrystallization treated Cu plating layer formed on the Cu-baked electrode layer; and
   at least one upper-side plating layer formed on the Cu plating layer.

2. The electronic device according to claim 1, wherein the electronic device main body includes a ceramic sintered body and an internal electrode disposed therein, and the external electrode is electrically connected to the internal electrode.

3. The electronic device according to claim 1, wherein the electronic device is a multilayer ceramic capacitor.

4. The electronic device according to claim 1, wherein the Cu plating layer has an average particle diameter of 3.0 to 5.0 μm.

5. The electronic device according to claim 1, wherein the at least one upper-side plating layer is a Ni plating layer.

6. The electronic device according to claim 5, further comprising an Sn plating layer formed on the Ni plating layer.

* * * * *

UNITED STATES PATENT AND TRADEMARK OFFICE
CERTIFICATE OF CORRECTION

| | | |
|---|---|---|
| PATENT NO. | : 8,179,660 B2 | Page 1 of 1 |
| APPLICATION NO. | : 11/935854 | |
| DATED | : May 15, 2012 | |
| INVENTOR(S) | : Hiroshi Katsube et al. | |

It is certified that error appears in the above-identified patent and that said Letters Patent is hereby corrected as shown below:

Title page, Item 30 Foreign Application Priority Data please delete "Mar. 6, 2005" and replace with June 3, 2005

Signed and Sealed this

Thirtieth Day of October, 2012

David J. Kappos
*Director of the United States Patent and Trademark Office*